Nov. 16, 1948.  G. R. PENNINGTON  2,453,811
COMBINATION FLUID COUPLING AND FRICTION CLUTCH
Filed March 17, 1944  2 Sheets-Sheet 2
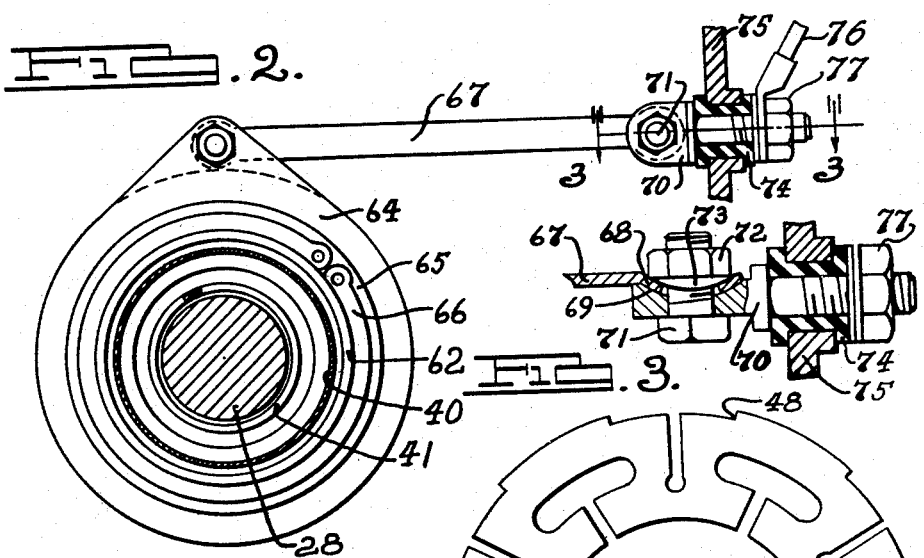
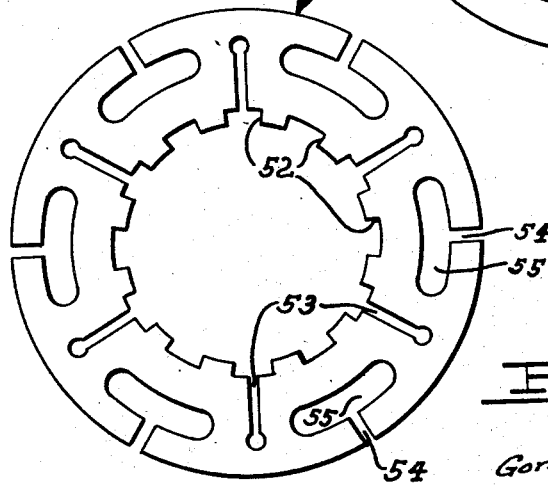
INVENTOR.
Gordon R. Pennington
BY
Harness and Harris
ATTORNEYS.

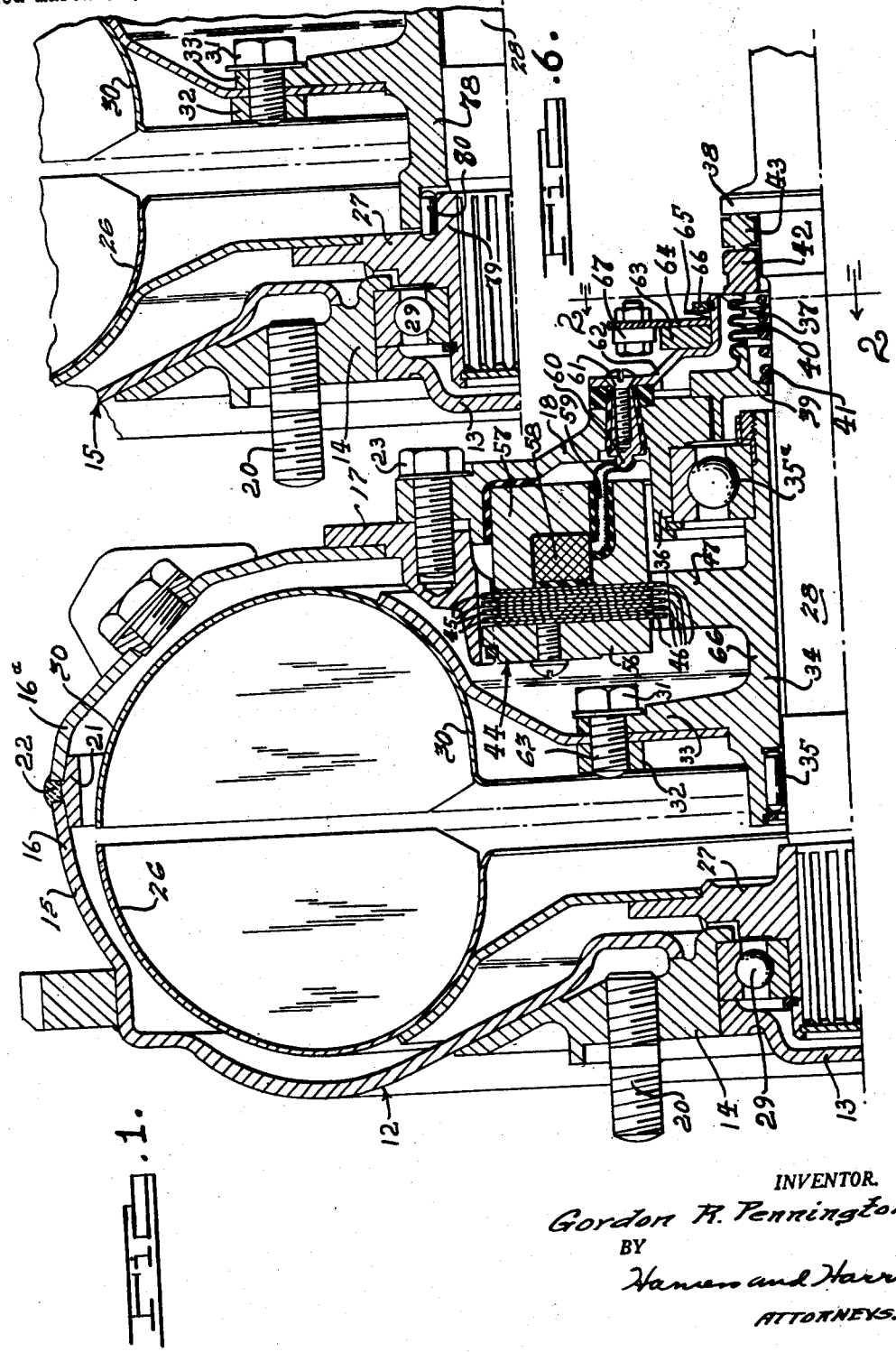

Patented Nov. 16, 1948

2,453,811

UNITED STATES PATENT OFFICE 2,453,811

COMBINATION FLUID COUPLING AND FRICTION CLUTCH

Gordon R. Pennington, Bloomfield Hills, Mich., assignor to Chrysler Corporation, Highland Park, Mich., a corporation of Delaware Application March 17, 1944, Serial No. 526,908

16 Claims. (Cl. 192—3.2)

This invention relates to the association of a clutch with a fluid coupling. More specifically it relates to the association of a magnetic clutch with a fluid coupling in such a manner that the coupling and clutch are carried within the same housing. The term "fluid coupling" as used herein is intended to cover any means by which power is transmitted through fluid, such means being a fluid coupling in the common accepted sense, a torque converter, or any like device. The invention also relates to improvement in current-conducting parts, which may incidentally be applied to a magnetic clutch.

Lemon application Serial No. 526,858, filed March 17, 1944, now Patent No. 2,415,894, February 18, 1947, discloses and claims a certain arrangement of a fluid coupling and a magnetic clutch. That arrangement is claimed broadly and specifically in the Lemon application. The present application discloses two arrangements of fluid coupling and magnetic clutch differing somewhat from that of the Lemon application and has claims to these two forms. The present application also claims a certain arrangement of current-conducting parts disclosed both in the Lemon application and in the present application.

An object of the present invention is to provide an improved arrangement of a fluid coupling and a clutch. More specifically, this arrangement involves a magnetic clutch.

Another object is to provide improvements in the sealing of a unit involving a fluid coupling and a clutch.

A still further object is to provide improvements in the arrangement of current conducting parts. In a magnetic clutch as employed in the present invention, there may be misalignments of parts upon assembly and wear between stationary and rotating parts, and the arrangement contemplated for supplying current to these parts permits some shifting of these parts while insuring that electrical connections are maintained.

Other objects will be apparent from the disclosure.

Fig. 1 is a view partially in section showing the novel association of clutch and fluid coupling of the present invention;

Fig. 2 is a sectional view taken on the line 2—2 of Fig. 1;

Fig. 3 is a sectional view taken on the line 3—3 of Fig. 2;

Figs. 4 and 5 are detail views showing plates forming part of the magnetic clutch employed in the present invention; and Fig. 6 is a view partially in section showing a modified association of a fluid coupling and a magnetic clutch.

A unitary structural assembly 12 includes a closure member 13, a fitting 14, a casing 15 formed of casting parts 16 and 16ᵃ, a ring 17, and an end member 18. The closure member 13 may be press-fitted within the fitting 14 which carries bolts 20 by means of which the structure assembly 12 is connected to an engine crankshaft, not shown. The casing part 16 is suitably secured to the fitting 14 as by soldering or welding and the casing part 16ᵃ is in turn connected to the casing part 16 by a ring 21 and by soldering or welding indicated at 22. The ring 17 is connected to the casing part 16ᵃ by soldering or welding and the end member 18 is secured to the ring 17 by bolts 23. Positioned within the casing 15 is a runner structure 26 secured to a hub member 27 keyed to one end of a shaft 28. The other end of the shaft 28 extends into a transmission case, not shown. The hub 27 and the said one end of the shaft 28 are journalled upon the fitting 14 by means of a ball bearing 29. An impeller structure 30 is secured by a bolt 31 and a nut 32 to a flange 33 of a sleeve 34. The inner portion of one end of the sleeve 34 is journalled by roller bearings 35 on the shaft 28, and the other end of sleeve 34 is journalled at the outside by a ball bearing 35ᵃ in a flange 36 of the end member 18. A seal 37, acting between the casing 15 and a flange 38 on the shaft 28, comprises a flanged ring 39, a bellows 40, a spring 41, and rings 42 and 43. It will be observed that the spacing between the bearing 35 and 35ᵃ is relatively great and so provides stability for the sleeve 34.

A magnetic clutch 44 includes a set of alternate discs 45 keyed to the ring 17 and a set of alternate discs 46 keyed to a flange 47 of the sleeve 34. Fig. 4 shows each clutch disc 45 to have notches 48 cut in its external periphery for keying the discs 45 to the ring 17. A radial slit 49 extents inwardly from each notch 48. A plurality of radial slits 50 extend outwardly from the inside of the disc 45 and terminate in enlarged openings 51. Fig. 5 shows each clutch disc 46 to have a plurality of notches 52 in its inner side by which it is keyed to the tubular member 34. Each disc 46 also has radial slots 53 extending outwardly from the inner periphery and radial slots 54 extending inwardly from the outer periphery and terminating in enlarged openings 55. Magnetic clutch 44 also includes an armature 56, a magnet 57, and a coil 58. Current is conducted to the coil 58 by a wire 59 connected to one of nuts 60, in turn connected to bolts 61, in turn connected to a supporting member 62. Mounted upon the supporting member 62 is a ring 63 which may be of graphite material. A metallic ring 64 rests against the ring 63. A spring ring 65 held in place by a retaining ring 66 and acting directly against the ring 64, presses the ring 63 into contact with the supporting member 62. The ring 64 is connected to a conducting strip 67, which has a curved perforated end 68, secured to a concave surface 69 in an end of an electrical connector 70 by a bolt 71 and a nut 72 having a convex end 73. The electrical connector 70 is mounted in an insulating member 74 in a portion 75 of the clutch housing. An electrical lead 76 is attached to the connector 70 by a nut 77 threaded on the connector 70. The drawing shows the ring 83 and the supporting member 62 to contact over both a cylindrical area and an annular radial area. The radial area is the real current-transmitting area, for wear of the ring 63 will not interfere with contact at this region.

During operation supplying of current to the magnetic clutch 44 causes the armature 56 to be attracted toward the magnet 57 so that the clutch plates 45 are in driving engagement with the clutch plates 46. Thus rotation of the casing 15 produced by rotation of the crankshaft acting through the bolts 20 is transmitted through the engaged magnetic clutch 44 to the tubular member 34 and the impeller structure 30. Rotation of the impeller structure 30 acts through the fluid contained in the casing 15 to rotate the runner structure 26 which acts through the hub member 27 to rotate the shaft 28 extending into the transmission casing. When drive is to be interrupted, the magnetic clutch 44 is disengaged by interruption of the electric current flowing to the clutch. When this takes place the armature 56 is no longer attracted to the magnet 57 and the clutch plates 45 slip with respect to the clutch plates 46. When the clutch is thus disengaged the casing 15 housing the impeller and runner structures 30 and 26 rotates but these structures do not rotate. It will be apparent that the fluid within the casing 15 may reach the clutch plates 45 and 46 and when the clutch is disengaged the fluid helps the plates slip on one another so that disengagement is complete. It is also apparent that the problem of sealing the fluid coupling is very much simplified for only the single seal 37 is required since the clutch is housed within the parts to which the fluid of the fluid coupling has access.

As seen in Figs. 2 and 3 the conducting strip 67 is wide enough to resist rotation of ring 64 and thin enough to flex and so to permit axial movement of the ring 63. Furthermore, the securement of the conducting strip 67 to the electrical conductor 70 by the curved end 68 on strip 67, the convex end 73 on nut 72, and the concave surface 69 on conductor 70 permits a shifting of the angle of the conducting strip 67 to accommodate axial movement of the ring 64 toward the supporting member 62. Fig. 3 shows the opening in the curved end 68 of the conducting strip 67 to be somewhat larger than the diameter of the bolt 71 so that the curved end 68 can be shifted with respect to the nut 72 and the electrical conductor 70. Axial movement of the ring 64 may be due to wear between the ring 63 and the supporting member 62 or to movement of the entire assembly caused by vibration. Moreover, the shape and dimensions of the conducting strip 67 and the curved surfaces on nut 72 and connector 70 allows compensation for any lateral misalignment upon assembly between the ring 64 and the connector 70.

In the modified form of Fig. 6 a sleeve 78 immediately surrounds a driven shaft 28 as does the sleeve 34 of the form of Fig. 1, and the right end, not shown, of the sleeve 78 is journalled by a bearing in the end part of the casing secured to the casing as the sleeve 34 is journalled by bearing 35a in end member 18 secured to the casing 15. However, the sleeve 78 is longer, and its left end is expanded and journalled on a cylindrical portion 79 of the hub 27 by roller bearings 80. An advantage is that there is a greater length between the bearing-supported ends of the sleeve 78, and so there is less tilting of the sleeve due to inequalities and misalignments. Another advantage is that upon withdrawal of the shaft 28 during disassembly the left end of the sleeve 78 is not left unsupported.

It is the intention to limit the invention only within the scope of the appended claims.

I claim:

1. In combination, a rotating member, a stationary member held in contact with the rotating member for transmission of electrical current between the members, a conductor connected at one end to the stationary member and having its other end curved, a fixed conducting part having a curved surface, and means including a securing element having a curved surface for connecting the conductor to the fixed conducting part by holding the curved end of the conductor between the curved surface of the fixed conducting part and the curved surface of the securing element, the curved surfaces and curved end permitting the necessary shifting of the conductor to accommodate axial movement of the stationary member.

2. In combination, a rotating member, a stationary member held in contact with the rotating member for transmission of electrical current between the members, a conducting strip connected at one end to the stationary member and having its other end curved, a fixed conducting part having a curved surface, and means including a securing element having a curved surface for connecting the conducting strip to the fixed conducting part by holding the curved end of the conducting strip between the curved surface of the fixed conducting part and the curved surface of the securing element, the curved surfaces and curved end permitting the necessary shifting of the conducting strip to accommodate axial movement of the stationary member, the conducting strip having a relatively great width and a relatively small thickness, the width and thickness being so disposed with respect to the stationary member as to cause the relatively great width to resist rotation of the stationary member and the relatively small thickness to permit flexing of the conducting strip necessary to accommodate axial movement of the stationary member.

3. In combination, a magnetic clutch comprising sets of plates and magnetic parts attractable to one another under the action of electric current to press between them the plates for causing driving engagement between the plates, a rotating member associated with the magnetic clutch to supply electric current thereto, a stationary member held in contact with the rotating member for transmission of electrical current between the members, a conductor connected at one end to the stationary member and having its other end curved, a fixed conducting part having a curved surface, and means including a securing element having a curved surface for connecting the conductor to the fixed conducting part by holding the curved end of the conductor between the curved surface of the fixed conducting part and the curved surface of the securing element, the curved surfaces and curved end permitting the necessary shifting of the conductor to accommodate axial movement of the stationary member.

4. In combination, a magnetic clutch comprising sets of plates and magnetic parts attractable to one another under the action of electric current to press between them the plates for causing driving engagement between the plates, a rotating member associated with the magnetic clutch to supply electric current thereto, a stationary member held in contact with the rotating member for transmission of electrical current between the members, a conducting strip connected at one end to the stationary member and having its other end curved, a fixed conducting part having a curved surface, and means including a securing element having a curved surface for connecting the conducting strip to the fixed conducting part by holding the curved end of the conducting strip between the curved surface of the fixed conducting part and the curved surface of the securing element, the curved surfaces and curved end permitting the necessary shifting of the conducting strip to accommodate axial movement of the stationary member, the conducting strip having a relatively great width and a relatively small thickness, the width and thickness being so disposed with respect to the stationary member as to cause the relatively great width to resist rotation of the stationary member and the relatively small thickness to permit flexing of the conducting strip necessary to accommodate axial movement of the stationary member.

5. A power-transmitting device comprising a casing, impeller and runner structures positioned within the casing, a driven shaft extending into the casing through the impeller structure into driving connection with the runner structure, a sleeve directly surrounding the shaft and secured to the impeller structure, and a clutch positioned within the casing and acting between the casing and the sleeve.

6. A power-transmitting device comprising a casing, impeller and runner structures positioned within the casing, a driven shaft extending into the casing through the impeller structure into driving connection with the runner structure, a sleeve within the casing directly surrounding the shaft and secured to the impeller structure, a clutch positioned within the casing and acting between the casing and the sleeve, and a seal acting between the casing and the shaft.

7. A power-transmitting device comprising a casing, impeller and runner structures positioned within the casing, a driven shaft extending into the casing through the impeller structure into driving connection with the runner structure and having a shoulder outside an end of the casing, a sleeve within the housing directly surrounding the shaft and secured to the impeller structure, a clutch positioned within the casing and acting between the casing and the sleeve, and a seal abutting the shoulder on the shaft and the said end of the casing so as to act between the shaft and the casing.

8. A power-transmitting device comprising a casing, impeller and runner structures positioned within the casing, a driven shaft extending into the casing through the impeller structure into driving connection with the runner structure, a sleeve journalled within the housing on the shaft and secured to the impeller structure, a clutch positioned within the casing and comprising two interengaged sets of plates, one set of plates being connected to the housing, and the other set to the sleeve, and a seal acting between the casing and the shaft.

9. A power-transmitting device comprising a casing, impeller and runner structures positioned within the casing, a driven shaft extending into the casing through the impeller structure into driving connection with the runner structure and having a shoulder outside an end of the casing, a sleeve journalled within the housing on the shaft and secured to the impeller structure, a clutch positioned within the casing and comprising two interengaged sets of plates, one set of plates being connected to the housing, and the other set to the sleeve, and a seal abutting the shoulder on the shaft and the said one end of the casing so as to act between the shaft and the casing.

10. A power-transmitting device comprising a casing, impeller and runner structures positioned within the casing, a driven shaft extending into the casing through the impeller structure into driving connection with the runner structure, a sleeve journalled within the housing on the shaft and secured to the impeller structure, a magnetic clutch comprising interengaged sets of plates, one set of plates being connected to the casing, and the other set to the sleeve and parts at opposite sides of the plates attractable toward one another for pressing the sets of plates into driving engagement, and a seal acting between the casing and the shaft.

11. A power-transmitting device comprising a casing, impeller and runner structures positioned within the casing, a driven shaft extending into the casing through the impeller structure into driving connection with the runner structure and having a shoulder outside an end of the casing, a sleeve positioned within the housing about the shaft and secured to the impeller structure, bearing means within one end of the sleeve for journalling the said one end of the sleeve on the shaft, bearing means around the other end of the sleeve for journalling the said other end of the sleeve in the casing, a magnetic clutch comprising interengaged sets of plates, one set of plates being connected to the housing, and the other set to the sleeve and parts at opposite sides of the plates attractable toward one another for pressing the sets of plates into driving engagement, and a seal abutting the shoulder on the shaft and the said end of the casing so as to act between the shaft and the casing.

12. A power-transmitting device comprising a casing, impeller and runner structures positioned within the casing, a hub member secured to the runner structure and forming a mounting therefor, a driven shaft extending into the casing through the impeller structure into driving connection with the hub member, a sleeve secured to the impeller structure and forming a mounting therefor, means journalling the sleeve on the hub member, and a clutch positioned within the casing and acting between the casing and the sleeve.

13. A power-transmitting device comprising a casing, impeller and runner structures positioned within the casing, a hub member secured to the runner structure and forming a mounting therefor, a driven shaft extending into the casing through the impeller structure into driving connection with the hub member, a sleeve secured to the impeller structure and forming a mounting therefor, means journalling one end of the sleeve on the hub member, means journalling the other end of the sleeve on the casing, a clutch positioned within the casing and acting between the casing and the sleeve, and a seal acting between the casing and the shaft.

14. A power-transmitting device comprising a casing, impeller and runner structures positioned within the casing, a hub member secured to the runner structure and providing a mounting therefor, a driven shaft extending into the casing through the impeller structure into driving connection with the hub member and having a shoulder outside an end of the casing, a sleeve positioned within the casing about the shaft and secured to the impeller structure, bearing means within one end of the sleeve for journalling the said one end of the sleeve on the hub member, bearing means around the other end of the sleeve for journalling the said other end of the sleeve in the casing, a magnetic clutch comprising interengaged sets of plates, one set of plates being connected to the casing, and the other set to the sleeve and parts at opposite sides of the plates attractable toward one another for pressing the sets of plates into driving engagements, and a seal abutting the shoulder on the shaft and the said end of the casing so as to act between the shaft and the casing.

15. A power-transmitting device comprising a casing, impeller and runner structures positioned within the casing, a driven shaft extending into the casing through the impeller structure into driving connection with the runner structure, a sleeve journalled within the housing on the shaft and secured to the impeller structure, a seal acting between the casing and the shaft, a magnetic clutch comprising interengaged sets of plates, one set of plates being connected to the housing, and the other set to the sleeve and parts at opposite sides of the plates attractable toward one another for pressing the sets of plates into driving engagement, a rotating member associated with the magnetic clutch to supply electric current thereto, a stationary member held in contact with the rotating member for transmission of electrical current between the members, a conducting strip having a relatively great width and a relatively small thickness, a fixed object, means connecting one end of the conducting strip to the fixed object, and means connecting the other end of the conducting strip to the stationary member, the strip being so arranged as to resist by virtue of its relatively great width rotation of the stationary member and to permit by virtue of its relatively small thickness flexing of the strip to accommodate axial movement of the stationary member.

16. A power-transmitting device comprising a casing, impeller and runner structures positioned within the casing, a driven shaft extending into the casing through the impeller structure into driving connection with the runner structure and having a shoulder outside an end of the casing, a sleeve positioned within the housing about the shaft and secured to the impeller structure, bearing means within one end of the sleeve for journalling the said one end of the sleeve on the shaft, bearing means around the other end of the sleeve for journalling the said other end of the sleeve in the casing, a seal abutting the shoulder on the shaft and the said end of the casing so as to act between the shaft and the casing, a magnetic clutch comprising interengaged sets of plates, one set of plates being connected to the housing, and the other set to the sleeve and parts at opposite sides of the plates attractable toward one another for pressing the sets of plates into driving engagement, a rotating member associated with the magnetic clutch to supply electric current thereto, a stationary member held in contact with the rotating member for transmission of electrical current between the members, a conductor connected at one end to the stationary member and having its other end curved, a fixed conducting part having a curved surface, and means including a securing element having a curved surface for connecting the conductor to the fixed conducting part by holding the curved end of the conductor between the curved surface of the fixed conducting part and the curved surface of the securing element, the curved surfaces and curved end permitting the necessary shifting of the conductor to accommodate axial movement of the stationary member.

GORDON R. PENNINGTON.

REFERENCES CITED

The following references are of record in the file of this patent:

UNITED STATES PATENTS

| Number | Name | Date |
| --- | --- | --- |
| 1,108,940 | Starker | Sept. 1, 1914 |
| 1,224,856 | Chryst | May 1, 1917 |
| 1,336,544 | Sullivan | April 13, 1920 |
| 1,529,191 | Kettering | March 10, 1925 |
| 1,597,887 | Himes | Aug. 31, 1926 |
| 1,657,603 | Banning Jr. | Jan. 31, 1928 |
| 1,823,334 | Payne | Sept. 15, 1931 |
| 1,944,952 | Rouge | Jan. 30, 1934 |
| 2,184,606 | DeLavaud | Dec. 26, 1939 |
| 2,254,625 | Ryba | Sept. 2, 1941 |
| 2,278,604 | Youhouse | April 7, 1942 |
| 2,296,642 | Huebner, Jr. | Sept. 22, 1942 |